United States Patent [19]

Alyfuku et al.

[11] Patent Number: 4,664,495
[45] Date of Patent: May 12, 1987

[54] REAR LIGHT DETECTING DEVICE FOR CAMERA

[75] Inventors: Kiyoshi Alyfuku; Shuichi Tamura, both of Kanagawa, Japan

[73] Assignee: Canon Kabushiki Kaisha, Japan

[21] Appl. No.: 720,548

[22] Filed: Apr. 8, 1985

[30] Foreign Application Priority Data

Apr. 9, 1984 [JP] Japan .................................. 59-70496
May 2, 1984 [JP] Japan .................................. 59-88595
May 2, 1984 [JP] Japan .................................. 59-88596

[51] Int. Cl.⁴ ........................... G03B 7/28; G01J 1/42
[52] U.S. Cl. .................................... 354/430; 356/221; 356/222; 354/432
[58] Field of Search ....................... 354/403, 429–432; 356/221, 222; 250/214 P

[56] References Cited

U.S. PATENT DOCUMENTS 4,423,936  1/1984  Johnson .............................. 354/403

Primary Examiner—W. B. Perkey
Attorney, Agent, or Firm—Toren, McGeady and Goldberg

[57] ABSTRACT

A rear light condition detecting device for a camera is arranged to measure distances to a plurality of parts appearing within a taking picture plane on the assumption that an object located nearby is the main object to be photographed or that a light source such as the sun is among faraway objects. The device determines the object to be in a rear-light or counter-light condition in cases where the luminance of the nearby object is extremely lower than other objects or that of a faraway object is extremely higher than other objects.

5 Claims, 12 Drawing Figures

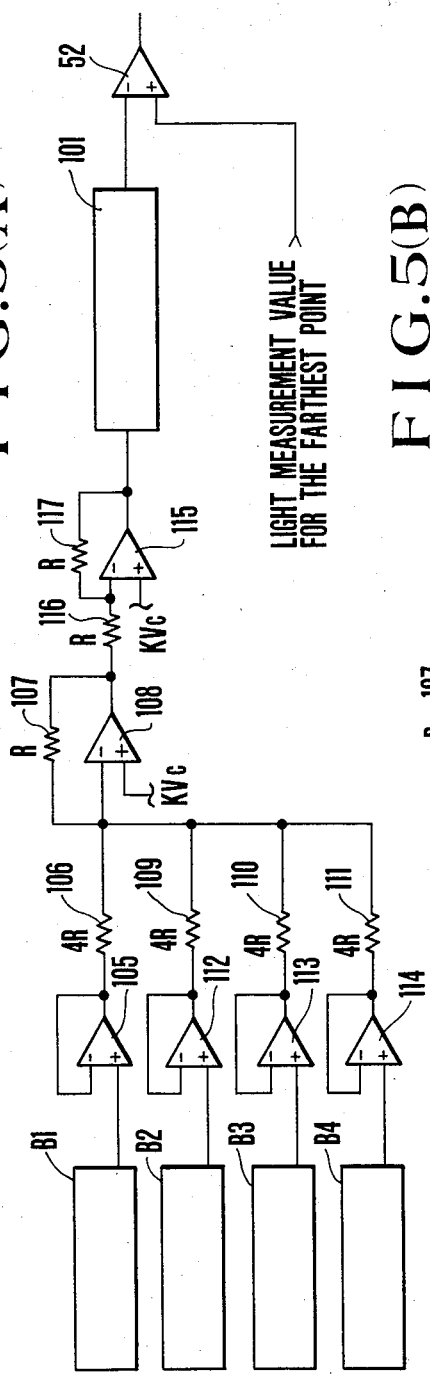
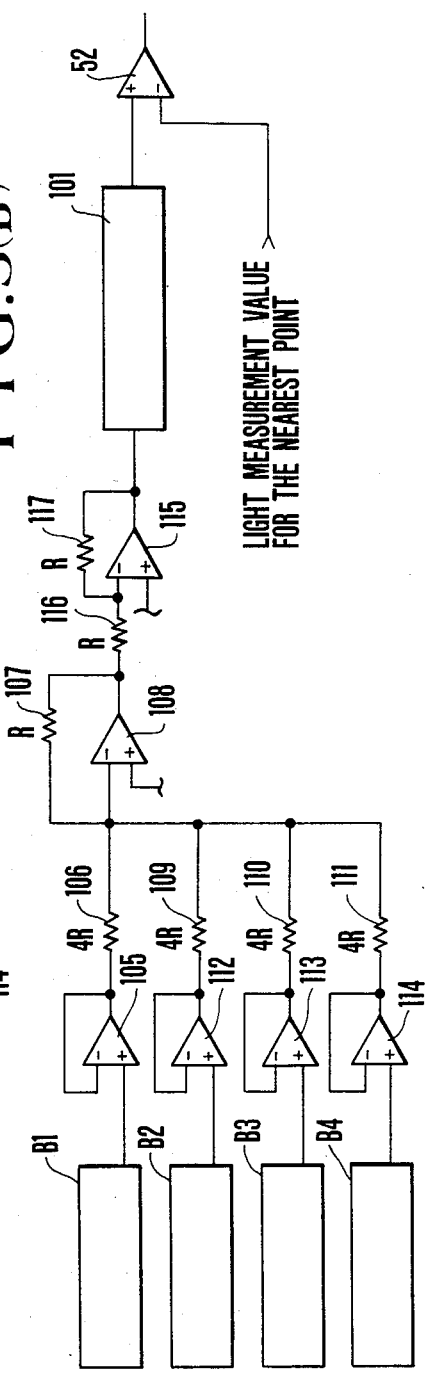

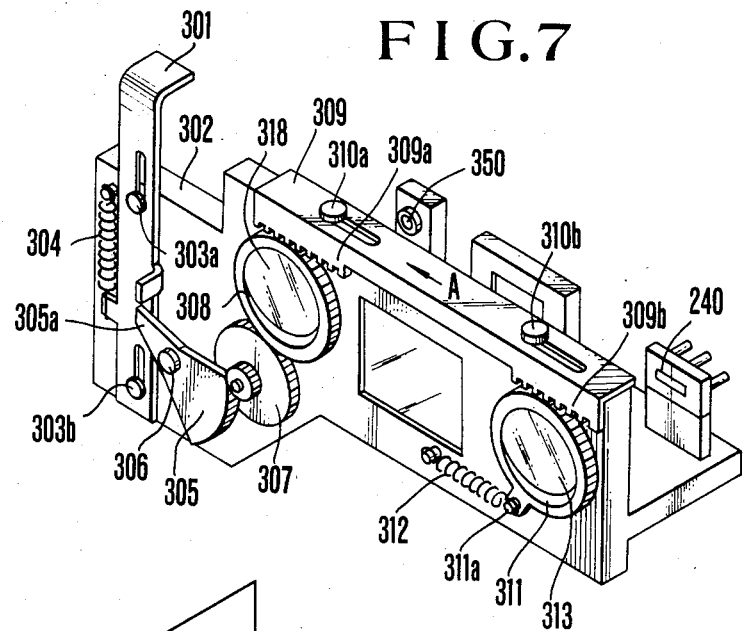
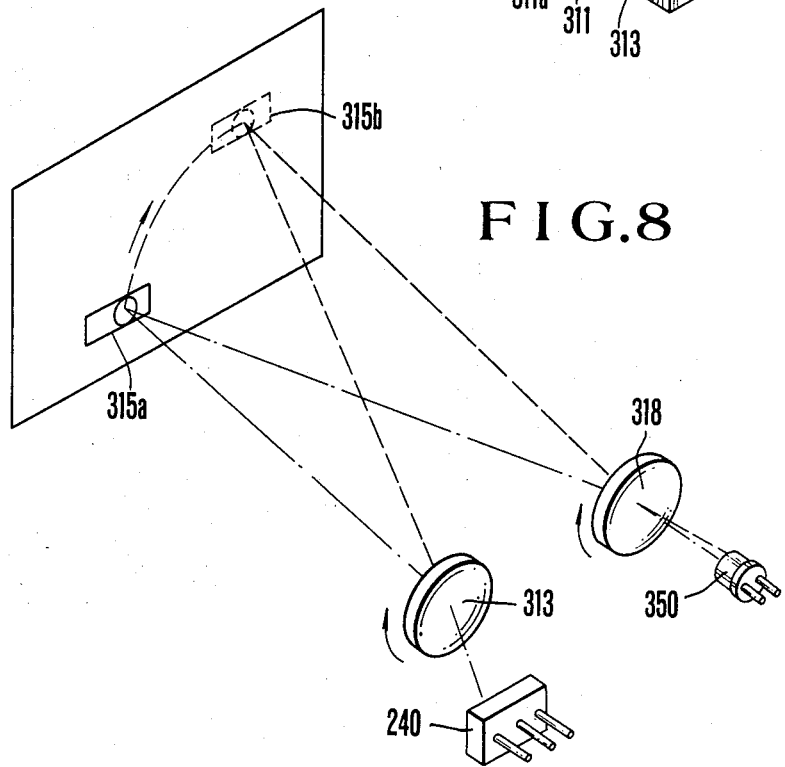

REAR LIGHT DETECTING DEVICE FOR CAMERA

BACKGROUND OF THE INVENTION

1. Field of the Invention

This invention relates to a rear light condition detecting device for a camera and more particularly to a device which determines a rear-light shot condition from a combination of information on the distance to an object to be photographed and information on the luminance of the object.

2. Description of the Prior Art

In order to adequately perform an exposure for a picture taking plane as a whole, cameras in general employ an averaging light measuring method in which an average value of luminance information for the whole picture plane is obtained. However, where the sunlight is directly incident on the picture plane, the average light measurement value increases, resulting in a photograph in which the main object is extremely underexposed.

To avoid such a result, it is necessary to detect a rear light condition and to make spot light measurement giving priority to information on the luminance of the main object. In a method heretofore employed for automatically carrying out this operation, the luminance of the middle of the picture taking plane is compared with the average luminance of the whole picture plane. If the difference between them is above a predetermined value, the photography object is considered to be in a rear light condition and a spot light measurement is carried out giving priority to the luminance of the middle of the picture plane. In other words, although the location of the main object is known only by the photographer, the main object to be photographed is in the middle of the picture plane in the majority of cases. Therefore, in this method, the luminance of the middle of the picture taking plane is simply assumed to represent the luminance of the main object and a rear light condition correcting operation is automatically carried out without recourse to manual adjustment by the photographer. Thus, in cases where the luminance of the middle part is much lower than the average luminance of the whole picture plane, the object is determined to be under a rear light condition brought about by the sunlight or the like.

In accordance with this method, however, if the main object is not located in the middle part of the picture taking plane, the object is either determined not to be under a rear light condition when it is actually under a rear light condition or no spot light measurement is carried out even when it is determined to be under a rear light condition. Therefore, in such a case, rear light correction cannot be adequately carried out.

Furthermore, in a generally practiced method for coping with a rear light condition, the main object is imparted with an apposite luminance by illuminating it with a flash light of a flash device. However, the light of the flash device would not reach the main object if it is located far away. In that event, the flash light not only fails to correct the rear light condition but would rather increase the difference between the luminance of the main object and the average luminance of the whole picture taking plane.

A first object of this invention is to provide a rear light detecting device for a camera, wherein distances to a plurality of parts appearing within a picture taking plane are measured on the assumption that an object located nearby is the main object to be photographed or that a light source, such as the sun, is among faraway objects; and the luminance of the main object is compared with that of other objects to determine that the main object is under a rear light condition if the luminance of the main object is much lower than the luminance of others or if the luminance of the faraway objects is much greater than others, so that a rear light condition can be accurately determined regardless of the position of the main object within the picture taking plane.

A second object of this invention is to provide a rear light detecting device for a camera, wherein, when the external world is judged to be bright and in a rear light condition, if an object to be photographed is located at a near distance, the object is illuminated by the light of a flash device; and, if the object to be photographed is located at a medium or far distance, an automatic exposure (AE) time of the camera is shifted to a longer exposure time value.

These and further objects and features of this invention will become apparent from the following detailed description of the preferred embodiment thereof taken in conjunction with the accompanying drawings.

SUMMARY OF THE INVENTION

According to this invention, assuming that a nearby object is the main object to be photographed, the main object is judged to be under a rear light condition if the luminance of an average luminance value of objects located at a far away or medium distance is higher than a predetermined level in comparison with the luminance of the nearby object. Furthermore, with objects which are judged to be far away forming a background including an intensive light source such as the sunlight, the photography scene is judged to be in a rear light condition if the luminance of far away objects is above a predetermined level in comparison with the luminance or an average luminance value of objects located at a medium distance.

Therefore, where the object to be photographed is under a rear light condition and is located at a near distance within effective reach of a flash light, the rear light condition is corrected by the flash light. If the object distance is beyond reach of the flash light, the rear light condition is corrected by adjustment of the automatic exposure AE time. Therefore, the object can always be photographed with an adequare exposure. In addition, in the event that the external world is dark, camera movement due to hand vibration can always be prevented by the use of a flash light.

BRIEF DESCRIPTION OF THE DRAWINGS

FIGS. 5(A), 5(B) and 6 are circuit diagrams respectively showing additional circuits used for modifying the embodiment shown in FIG. 4.

FIG. 7 is an oblique view showing a field scanning mechanism employed in a rear light detecting device in another embodiment of this invention.

FIG. 8 is a schematic illustration showing the scanning operation principle of the mechanism shown in FIG. 7.

DETAILED DESCRIPTION OF THE PREFERRED EMBODIMENTS

Figure 1:
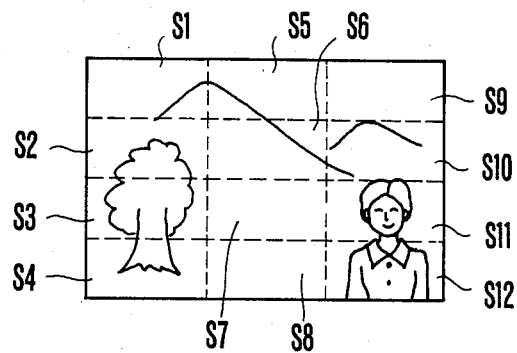
FIG. 1 is an illustration showing a photo taking picture plane in an embodiment of this invention.
Figure 2:
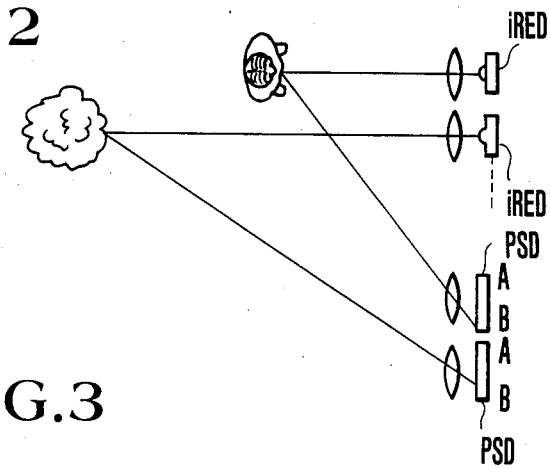
FIG. 2 is a schematic illustration showing the arrangement of PSD's employed in the embodiment of this invention.

The following describes some examples of an embodiment of this invention with reference to the accompanying drawings: FIG. 1 shows a photo taking picture plane. The picture plane consists of 12 distance measuring fields S1-S12 shown in a state of being divided by broken lines in FIG. 1. Each of the objects included in these fields S1-S12 has the distance thereto measured within its applicable field separate from others. More specifically, a pair of a light projecting elements and a light receiving element are provided for each of the 12 different fields S1-S12. Distances to different objects are thus measured for the distance measuring fields S1-S12. Position sensitive devices (hereinafter called PSD for short) are used as the light receiving elements while infrared ray emitting diodes (hereinafter called iRED) are used as the light projecting elements. The PSD, as well known, has output terminals at both ends thereof to produce two currents therefrom. The current from one output terminal increases and the other current from the other output terminal decreases as the position of a light flux incident on the PSD deviates from the middle and comes closer to one output terminal. Furthermore, the magnitude of the current is proportional to the intensity of the incident light. This property of the PSD is utilized in measuring the distance to and the luminance of the object imaged thereon through an optical system. As shown in FIG. 2, a light flux projected from each of the iRED's into a photography object is reflected by the object, returns and is incident on the corresponding PSD. The incident position of the reflected light flux deviates from the middle of the PSD and is nearer the output terminal on one side B of the PSD as the object is located nearer. The distance to the object is then detectable from the ratio of an output current produced from the output terminal B to a current produced from the other output terminal on an other side A of the PSD. With this arrangement provided for each of the distance measuring fields S1-S12, it is possible to detect the distance to the object located within every distance measuring field.

In the specific photo taking scene of FIG. 1, the distance measuring field S1 includes only a mountain and the sky which are located at far distances. For this field S1, a reflected light flux P comes closer to the output terminal on the side A of the PSD for the field S1. For the fields S2 and S3 which include trees located at a medium distance, reflected light fluxes are incident on the middle parts of the PSD's of these fields S2, S3 respectively. As for the fields S11 and S12 which include a person located at a near distance, reflected light fluxes are incident on parts close to the output terminals on the sides B of the PSD's of these fields S11 and S12. Such being the arrangement, the distances to different objects are respectively detectable.

Figure 3:
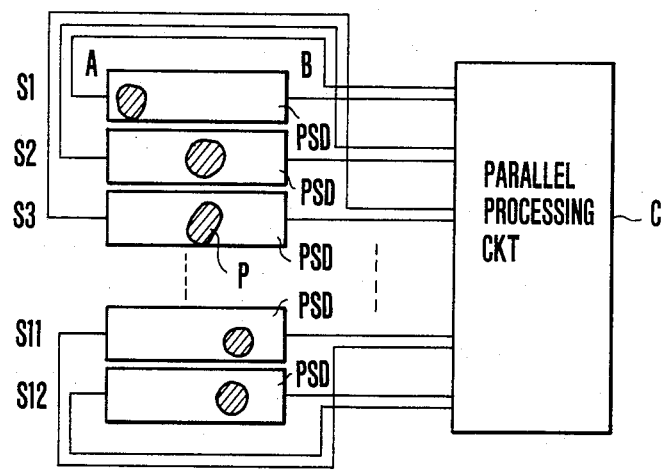
FIG. 3 shows the positions of the images of a reflected light resulting from a light flux projected on an object to be photographed.
Figure 4:
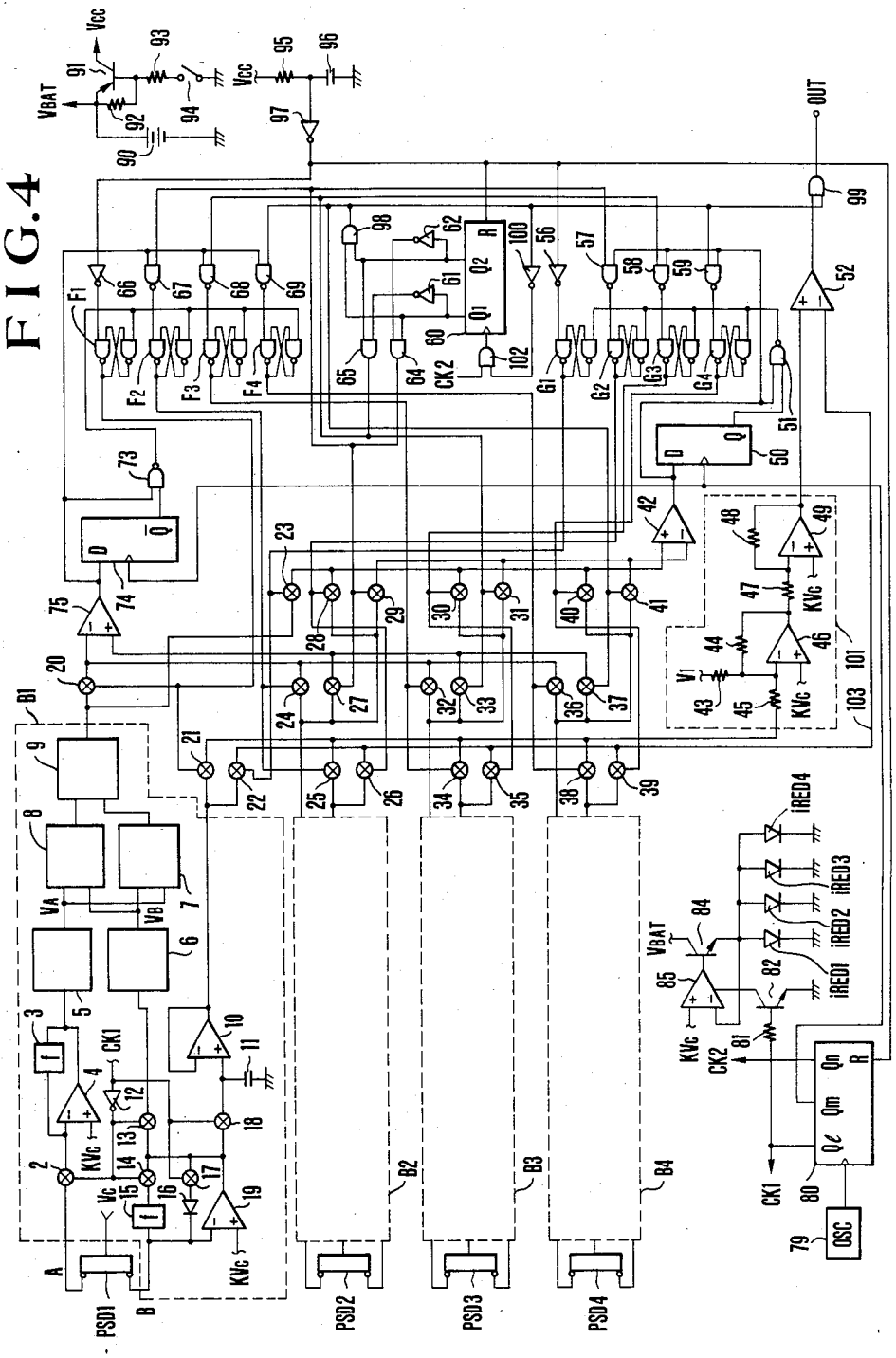
FIG. 4 is a circuit diagram showing a rear light detecting device in an embodiment of this invention.

A parallel processing circuit C which is shown in FIG. 3 has the details thereof shown in FIG. 4. For the sake of simplified illustration, FIG. 4 shows the arrangement for only four distance measuring fields S1-S4. The distance measuring field S is divided into the 12 fields S1-S12 as in FIG. 1. However, it may be divided into any desired number of fields S. The accuracy of distance measurement increases with the number of divided fields S. In the event of a greater number of divided distance measuring fields S, the parallel processing circuit C can simply be expanded by just increasing the number of circuits for the PSD's arranged in the same manner as shown in FIG. 4. Referring to FIG. 4, four PSD's PSD1, PSD2, PSD3 and PSD4 are arranged for the four distance measuring fields S1-S4. Signals produced from these PSD's PSD1-PSD4 are supplied to blocks B1, B2, B3 and B4 respectively. The circuit arrangement of each of these blocks B1-B4 is identical. Therefore, the details of the circuit arrangement are described only for the block B1 here. When a switch 94 is turned on at the start of distance measuring, light measuring and rear light detecting operations, a current flows from a battery 90 through resistors 92 and 93. A transistor 91 turns on producing a voltage Vcc at the collector thereof for operation of the system. With the voltage Vcc produced, an oscillator 79 begins to operate to produce a square wave. The square wave is frequency divided by a counter type frequency divider 80. The frequency divider 80 then obtains square waves of suitable different frequencies at its output terminals Ql, Qm and Qn. The terminals Ql and Qn then produce square waves CK1 and CK2 of different frequencies.

When the square wave CK1 is at a high level, a current flows to a resistor 81 to rurn on a transistor 82 and to turn off the output of an amplifier 85. If the square wave CK1 is at a low level, the transistor 82 turns off allowing a constant voltage circuit, which is formed by the amplifier 85 and a transistor 84, to operate. This lights up four infrared ray emitting diodes iRED1, iRED2, iRED3 and iRED4 which correspond to the four distance measuring fields S1-S4 respectively. Then, a suitable constant voltage KVc is applied to the amplifier 85. The arrangement is such that the diodes iRED1, iRED2, iRED3 and iRED4 turn on and off as the square wave CK1 turns on and off. Meanwhile, the square wave CK1 is also applied to the block B1 (as well as to other blocks B2, B3 and B4). Therefore, a group of analog switches 2, 14 and 13 and a pair of analog switches 17 and 18 turn on and off in synchronization with the on-and-off operation of the diodes iRED1, iRED2, iRED3 and iRED4 caused by the square wave CK1, in a manner shown in the following table:

| CK1 | iRED1-iRED4 | Analog switches 2, 14 and 13 | Analog switches 17 and 18 |
|---|---|---|---|
| high | put out | off | on |
| low | light up | on | off |

An inverter 12 causes the group of analog switches 2, 13 and 14 and the pair of analog switches 17 and 18 to turn on and off in a mutually inverse manner as shown in the table above.

When the analog switches 2, 13 and 14 are on and the analog switches 17 and 18 are off, the currents which are produced from the two ends A and B of the PSD PSD1 with reflected light received from the object as a result of the infrared rays emitted from the diode iRED1 are respectively processed through a pair consisting of an amplifier 4 and a filter 3 and another pair consisting of an amplifier 19 and a filter 15 to be current-to-voltage converted with signals of frequencies above a frequency band close to that of the square wave CK1 allowed to pass.

Blocks 5 and 6 represent sample-and-hold and amplification circuits which respectively sample and hold the output voltages of the amplifiers 4 and 19 and gain multiply these voltages. The blocks 5 and 6 thus produce voltages VA and VB, which correspond to the signals produced from both ends of the PSD PSD1. These voltages VA and VB are formed into a sum signal (VA+VB) and a difference signal (VA−VB) respectively through computing circuits 8 and 7. Furthermore, a signal (VA−VB)/(VA+VB) is obtained from the computing circuits 8 and 7 through a division circuit 9. This signal becomes the output of the block B1. This output of the block B1 corresponds to the object distance obtained from the PSD PSD1 and is not relative to the intensity of the light received by the PSD PSD1. In other words, the value (VA−VB) is divided by the value (VA+VB) to cancel the factor related to the intensity of the light. The voltage value of the output of the block B1 increases as the object distance increases by virtue of the difference value (VA−VB). Furthermore, the blocks B2, B3 and B4 which correspond to the PSD's PSD2, PSD3 and PSD4 likewise produce voltages which correspond to the object distances obtained at their applicable areas within the photo taking picture plane and are independent from the intensity of the light received.

Next, when the analog switches 17 and 18 are on and the analog switches 2, 14 and 13 are off, the light incident on the PSD PSD1 solely consists of the light of the object since the diode iRED1 is not lit. Furthermore, since the connection of the output terminal A with the analog switch 2 is cut off, the photo current produced by the PSD PSD1 all flows from the other output terminal B. This photo current is converted into a logarithmically compressed voltage value by the amplifier 19 and a diode 16 and is produced from the amplifier 19. The logarithmically compressed voltage is supplied to a sample-and-hold circuit formed by a capacitor 11 and an amplifier 10. The voltage is thus produced from the block B1 as a voltage representing the luminance of an object within the area of the phototaking picture plane corresponding to the PSD PSD1.

Other blocks B2, B3 and B4 likewise produce voltages representing the luminances of objects of areas within the corresponding picture taking planes.

The information on the measured distances and luminances of objects appearing in the areas within the photo-taking picture plane is thus respectively obtained from these corresponding blocks B1, B2, B3 and B4. Among these measured distance information values, a value representing the farthest distance and a value representing the nearest distance are determined. Their luminance information values are compared with each other and a rear light condition or no rear light condition is determined from the difference between the farthest and nearest distance information values. The details of this rear light condition determining operation are as follows:

Again referring to FIG. 4, a negative input terminal "−" of a comparator 75 is connected via analog switches 20, 24, 32 and 36 to the measured distance information output terminals of the blocks B1, B2, B3 and B4. Meanwhile, a positive input terminal "+" of the comparator 75 is connected via analog switches 27, 33 and 37 to the measured distance information output terminals of the blocks B2, B3 and B4. The positive input terminal "+" of a comparator 42 is likewise connected via analog switches 23, 28, 30 and 40 to the measured distance information output terminals of the blocks B1, B2, B3 and B4. The negative input terminal "−" of the comparator 42 is connected via analog switches 29, 31 and 41 to the measured distance information output terminals of the blocks B2, B3 and B4. The comparator 75 is provided for finding an area which shows the farthest object distance while the comparator 42 is provided for finding an area showing the nearest object distance. A block 101 represents a rear light level setting circuit.

When the system operating voltage Vcc is produced with the switch 94 turned on, an initial value setting circuit which consists of a resistor 95, a capacitor 96 and an inverter 97 momentarily produces a high voltage to reset thereby a counter 60 and the frequency divider 80. Furthermore, the high voltage produced from the initial value setting circuit is inverted by inverters 66 and 56 to have the outputs of latch circuits F1 and G1 latched at a high level. Then, the analog switches 20, 21, 22 and 23 are turned on to allow measured distance information from the block B1 to be supplied to the negative terminal "−" of the comparator 75 and the positive terminal "+" of the comparator 42. Meanwhile, the measured light information which is produced from the block B1 is supplied to a rear light level setting circuit 101 and a line 103.

Following this, the fall of the square wave CK2 produced from the output terminal Qn of the frequency divider 80 causes the counter 60 (which receives the square wave CK2 via an AND gate 102 with the output of an inverter 100 being at a high level at that time) to have its output Q1 at a high level and its other output Q2 at a low level. The output level of an inverter 62 becomes high causing the output level of an AND gate 64 to become high. With the output level of the AND gate 64 becoming high, analog switches 27 and 29 turn on. Then, the measured distance information from the block B2 is supplied to the positive input terminal "+" of the comparator 75 and to the negative terminal "−" of the comparator 42. The measured distance information values from the two blocks B1 and B2 are compared.

As mentioned in the foregoing, the voltages of the measured distance information produced from the blocks B1-B4 increase as the object distance becomes longer. Assuming that the measured distance information voltages produced from the blocks B1, B2, B3 and B4 are in a magnitude relation of B1>B2>B3>B4, for example, the output of the comparator 75 is at a low level and that of the comparator 42 changes from a low level to a high level at that time. This change causes a one shot circuit which is formed by a D flip-flop 50 and a NAND gate 51 to momentarily produce a low level pulse which changes the output levels of latch circuits G1-G4 to low levels. In that distance, a NAND gate 57 is caused by the high level outputs of the AND gate 64 and the comparator 42 to produce a low level output. The low level output of the NAND gate 57 allows the latch circuit G2, which has already latched a high level output at that time, to keep its output at the high level. As a result, the output of the latch circuit G1 is at a low level and that of the latch circuit G2 is at a high level. This causes the analog switches 22 and 23 to turn off and the analog switches 26 and 28 to turn on. Then, in place of the measured distance information output from the block B1, the positive terminal "+" of the comparator 42 has the measured distance information output from the block B2 applied thereto. In place of the measured light information output from the block B1, the line 103 has the measured light information output from the block B2.

After that, when the square wave CK2 produced from the output terminal Qn of the frequency divider 80 falls next time, the level of the output Q1 of the counter 60 changes to a low level and that of the output Q2 to a high level. Accordingly, the output level of the AND gate 64 becomes low and that of the AND gate 65 high. The analog switches 27 and 29 turn off and the analog switches 31 and 33 turn on. Then, the signal supplied to the positive input terminal "+" of the comparator 75 and to the negative input terminal "−" of the comparator 42 is replaced with the measured distance information output voltage produced from the block B3.

Following this, the operation proceeds in the same manner as described above. Generally speaking, the high and low levels of the outputs Q1 and Q2 of the counter 60 interchange every time the square wave output CK2 produced from the output terminal Qn of the frequency divider 80 falls. Then, the outputs of a decoder consisting of the inverters 61 and 62, and AND gates 64, 65 and 98 become high, one after another. However, the output levels of the AND gates 64, 65 and 98 never simultaneously become high. Following this, the analog switches which are gate operated by the outputs of the decoder are turned on and off accordingly.

During this operation, when the positive input terminal "+" of the comparator 75 receives a larger measured distance information voltage (representing a farther distance) than the measured distance information voltage applied to the negative input terminal "−" of the comparator 75, the output level of the comparator 75 changes from a low level to a high level. The high level output causes the NAND gate, which has been receiving high level inputs from the AND gates 64, 65 and 98 among the NAND gates 67, 68 and 69, to change its output level from a high level to a low level. In response to this change, one latch circuit F1, F2 and F3 latches its output at a high level. As a result, one of the analog switches 24, 32 and 36 turns on causing the measured distance information voltage, which has been applied to the positive input terminal of the comparator 75, to be applied to the negative input terminal "−" of the comparator 75. Then, concurrently, one of the analog switches 25, 34 and 38 turns on. This allows the luminance information voltage of one of the blocks B2, B3 and B4, which has been applying the measured distance information voltage to the positive input terminal "+" of the comparator 75, to be supplied to the rear light level setting circuit 101. Meanwhile with the output level of the comparator 75 having been changed from a low level to a high level. The one-shot circuit which is formed by the D flip-flop 74 and the NAND gate 73 produces a low level signal to momentarily make the output levels of the latch circuits F1–F4 low. This inhibits the measured distance information voltage and the luminance information voltage which have been supplied to the negative input terminal "−" of the comparator 75 and the rear light level setting circuit 101 from being supplied to them.

If the negative terminal "−" of the comparator 42 receives a smaller measured distance information voltage representing a nearer object distance than the measured distance information voltage being applied to the positive terminal "+" of the comparator 42, the output level of the comparator 42 changes from a low level to a high level. The high level output of the comparator 42 then causes one of the NAND gates 57, 58 and 59 which has been receiving a high level input from the AND gates 64, 65 and 98 to change its output level from a high level to a low level. In response to this change, one of the latch circuits G2, G3 and G4 latches its output at a high level. Then, one of the analog switches 28, 30 and 40 turns on causing the measured distance information voltage which has been applied to the negative terminal "−" of the comparator 42 to be applied to the positive terminal "+" of the comparator 42. Concurrently, one of the analog switches 26, 35 and 39 turns on. This causes the luminance information voltage of one of the blocks B2, B3 and B4 which has been applying the measured information voltage to the negative terminal "−" of the comparator 42 to be produced at the line 103. Meanwhile, with the output level of the comparator 42 having changed from a low level to a high level, the one-shot circuit which is formed by the D flip-flop 50 and the NAND gate 51 momentarily produces a low level signal which causes the output levels of the latch circuits G1–G4 to become low. As a result, the measured distance information voltage and the luminance information voltage which have been supplied to the positive terminal "+" of the comparator 42 and the line 103 are inhibited from being supplied to them any longer.

When the above-stated process of operation, i.e. a searching operation, has advanced to have the levels of both the outputs Q1 and Q2 become high, the measured distance information voltages which represent the farthest and nearest object distances among all the areas of the picture taking plane reach the condition of having been supplied to the negative terminal "−" of the comparator 75 and the positive terminal "+" of the other comparator 42. Accordingly, the luminance information voltages representing the luminance values of the farthest and nearest objects are supplied via applicable switches among the analog switches 21, 22, 25, 26, 34, 35, 38 and 39 to the rear light level setting circuit and the line 103 respectively. For example, since the analog switches 20 and 21 are paired, the switch 21 also turns on if the other switch 20 is on. Then, the luminance information corresponding to the switch 21 is applied via the switch 21 to the rear light level setting circuit 101. Whether a rear light condition is obtained or not is thus determined in this manner.

In this specific embodiment, the measured distance information output produced from the block B1, which has the PSD PSD1, represents the farthest object distance. The output from the block B4, which has the PSD PSD4, represents the nearest object distance. The analog switches 40, 39, 20 and 21 eventually turn on through the above process of operation. The luminance information voltage, which is produced from the block B1 representing the luminance of the farthest object, is then supplied via the analog switch 21 to the rear light level setting circuit 101. This voltage is inverted and shifted to a predetermined voltage level through the amplifier 46 and resistors 43, 44 and 45. Constant voltages KVc and V1 are of suitable values. The constant voltage KVc prevents the output of the amplifier 46 from becoming lower than 0 V when the output of the amplifier 10 becomes a maximum value. The output of the amplifier 46 is received by an inverting amplifier consisting of an amplifier 49 and resistors 47 and 48 and thus increases as the value of the luminance information increases. The constant voltage KVc, which is of a suitable value, is applied to the amplifier 49 in such a manner that the output of the amplifier 49 never exceeds the voltage KVc regardless of the output value of the amplifier 46. The output of the amplifier 49 is applied to the positive terminal "+" of a comparator 52. Meanwhile, the luminance information voltage produced from the block B4 representing the luminance of the nearest object is supplied via the analog switch 39 to the line 103 and is then applied to the negative terminal "−" of the comparator 52 from the line 103. The luminance information voltage representing the luminance of the nearest object is then compared with the level, of the shifted luminance information voltage representing the luminance of the farthest object. The main object to be photographed is judged to be under a rear light condition if the output level of the comparator 52 is high (i.e. when the input voltage to the positive input terminal "+" is higher) and to be under a normal light condition if the output level of the comparator 52 is low. In other words, the comparator 52 does not produce a high level output unless the luminance information voltage representing the farthest object becomes higher by more than a predetermined level above the luminance information voltage representing the nearest object at the rear light level setting circuit 101. In the event of a high output level of the comparator 52, the main object has the sunlight behind it and is under a condition where the farthest object has a much higher luminance than the nearest object. The final output indicative of the result of the judgement as to whether the main object is under a rear light condition or under a normal light condition must be produced after completion of searching examination for all the areas and after determination of the farthest and nearest objects. Therefore, the embodiment supplies the output of the comparator 52 to the AND gate 99 for obtaining the final determination output after the levels of both the outputs Q1 and Q2 of the counter 60 become high causing the AND gate 98 to produce a high level output. Furthermore, after completion of the searching examination, it is not necessary to repeat the examination. Therefore, when the output level of the AND gate 98 becomes high, the high level output is supplied via an inverter 100 to an AND gate 102 to cancel the square wave being supplied to the counter 60.

The PSD's are employed in the embodiment described above. However, the PSD's may be replaced with any photo-electric converting elements such as CCD's that are capable of performing photo-electric conversion. When the CCD is employed, the distance measuring system must be arranged in a manner called the passive type. However, the passive type does not require any essential changes in the structural arrangement of the embodiment.

In the embodiment, as described above, information on object distances is obtained; far distant objects are considered to be the background having the sunlight which brings about a rear light condition; close-up objects are considered to be the main object to be photographed; information on the luminance of the far objects is compared with information on that of the near objects. If a difference between them obtained by this comparison is above a set level, the main object is judged to be under a rear light condition. Unlike the conventional system, the embodiment is capable of detecting a rear light condition without changing the angle of the camera regardless of the location of the main object. The embodiment thus enables the photographer to concentrate his or her attention of the composition of a picture without fear of a rear light condition.

This embodiment determines a rear light condition when the luminance of far objects and that of near objects are compared and the difference between them is a value above a predetermined value as mentioned above. However, if the rear light condition is considered to be a condition under which the main object has objects of much higher luminance in the background, a rear light condition may be determined by comparing the luminance information values of objects located at medium and near distances, objects located at an average distance and a near distance or objects located at the averaged distance and a far distance. Assuming that a nearby object is the main object, as in the majority of cases, the fact that the luminance value of objects other than the near object is higher than the near object indicates the presence of a brightening factor in the background of the near object. Therefore, a rear light condition is detectable by detecting by what degree the luminance value of the medium distance object or an average luminance value is higher than that of the main object.

Furthermore, assuming that the sunlight is included in a faraway object, a rear light condition is also detectable by finding out by what degree the luminance value of the faraway object is higher than the luminance value of medium distance objects or an average value of luminance.

The above-stated near light condition detecting operation can be carried out by the following arrangement: Let us first describe an embodiment to determine a rear light condition either on the basis of a luminance difference between a nearby object and an average measured light value or on the basis of the luminance difference between the average measured light value and the luminance of a faraway object. FIGS. 5(A) and 5(B) show circuits arranged to obtain the average of measured light values produced from the PSD's shown in FIG. 4. The blocks B1–B4 are arranged in the same manner as those shown in FIG. 4 to obtain the measured light values as sampled and held values. Referring to FIGS. 5(A) and 5(B), the measured light values produced from the PSD's are added up and averaged through buffers 105, 112, 113 and 114 by an amplifier 108 and resistors 106, 107, 109, 110 and 111. An averaged measured light value thus obtained is inverted by resistors 116 and 117 and an amplifier 115. The output of the amplifier 115 is greater as the addition value increases. The output terminal of the amplifier 115 which produces the averaged value is connected to the rear light level setting circuit 101, which is shown in FIG. 4. The comparator 52 of FIG. 4 then compares the output of the rear light level setting circuit 101 with the measured light value of the farthest point or object or with that of the nearest point or object which has been obtained through the same process as that described in FIG. 4. In this case, if a rear light condition is to be judged from a luminance difference between the averaged measured light value and the luminance of a freeway object, the output terminal of the rear light level setting circuit 101 is connected to the negative terminal "−" of the comparator 52. Meanwhile, the measured light value of the farthest point is supplied to the positive terminal "+" of the comparator 52. The comparator 52 produces a high level signal when the measured light value of the farthest point is higher than the averaged measured light value by a value greater than a predetermined value. A rear light condition is determined with this high level signal produced. Furthermore, if a rear light condition is to be judged from a luminance difference between the averaged measured light value and the luminance of a nearby object, the output terminal of the rear light level setting circuit 101 is connected to the positive terminal "+" of the comparator 52. Meanwhile the measured light value of the nearest point or object is supplied to the negative terminal "−" of the comparator 52. In the event that the averaged measured light value is higher than the measured light value of the nearest point by more than a predetermined value, the comparator 52 produces a high level signal to indicate a rear light condition. Furthermore, the measured light value of the nearest point is represented by a signal produced through the group of analog switches 22, 26, 35 and 39 shown in FIG. 4. The measured light value of the farthest point is represented by a signal produced through the group of analog switches 21, 25, 34 and 38 shown in FIG. 4.

Next, a method of determining a rear light condition on the basis of a luminance difference between objects located at a near distance and a medium distance, or a luminance difference between objects located at a medium distance and a far distance, will be described. In this case, inverters are connected to the outputs of the latch circuits F1 to F4 and G1 to G4 shown in FIG. 4. The inverters and the analog switches 21, 22, 25, 26, 34, 35, 38 and 39 constitute analog switches operating in the reverse condition. Therefore, voltages representing luminance information about objects located neither at the farthest distance nor at the nearest distance are selected from the blocks B1 to B4. The selected voltages are averaged and then compared with the measured light value of the farthest object or the nearest object by the same circuit as that shown in FIG. 5(A) or 5(B), so that whether or not the luminance difference exceeds a predetermined level can be determined.

In the event of a scene having the sky in the background, the sky is a high luminance object in general. In that instance, therefore, the above-stated embodiment might sometimes consider the main object to be under a rear light condition even when it is under a normal light condition. Another embodiment of this invention solves this problem. In this case, the level of the luminance difference to be used for determining a rear light condition is greater than other embodiments in view of the fact that the sky is always at an infinite distance. In other words, even if an object at infinity is of a high luminance value, the main object is not determined to be under a rear light condition if the luminance of the object at an infinite distance is about the same as the sky and is determined to be under a rear light condition only in the event of an extremely high luminance value, such as the sunlight. This embodiment is arranged as shown in FIG. 6.

Figure 6:
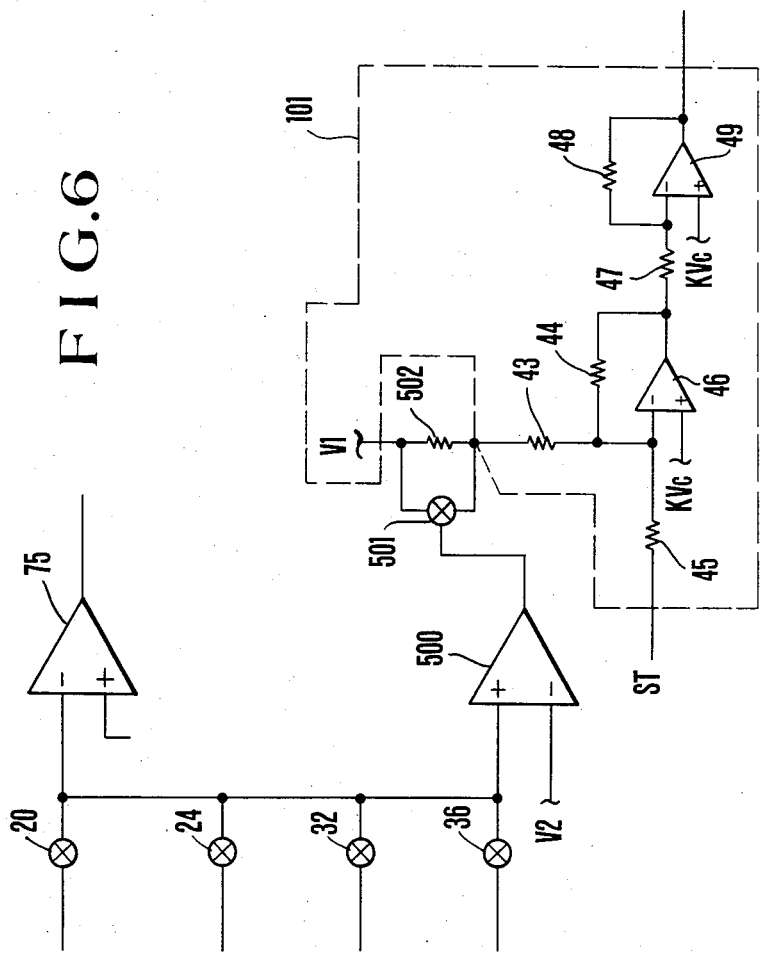

Referring to FIG. 6, the embodiment is provided with a circuit which is in addition to the circuit arrangement of FIG. 4. The additional circuit does not determine the main object to be under a rear light condition unless the luminance difference between the infinite distance object and the main object is greater than the degree of luminance difference in which the rear light condition may ordinarily be determined. The details of this embodiment are as follows: With the outputs of the distance measuring circuits compared, the output voltage of the PSD showing the farthest point is applied to the negative terminal "−" of the comparator 75 as mentioned in the foregoing. The greater the object distance, the higher the value of this voltage. The voltage value is compared with a suitably set constant voltage V2 which corresponds to an infinite distance by a comparator 500 which is additionally arranged. Where the measured distance information voltage is lower than the constant voltage V2, the output level of the comparator 500 becomes low to turn off an analog switch 501. A resistor 502 is connected to the resistor 43. If the measured distance information voltage is higher than the constant voltage V2, the object distance is judged to be at an infinite distance. Then, the output level of the comparator 500 becomes high turning on the analog switch 501. The resistor 502 is short-circuited. A current flowing through the resistor 43 becomes greater than a current which flows when the measured distance information voltage is lower than the constant voltage V2. In FIG. 6, the output terminals of the analog switches 21, 25, 24 and 38 are connected to a terminal ST. Thus, with the object distance judged to be at an infinite distance, level shifting increases. As a result, the embodiment does not determine the photography scene to be under a rear light condition unless the luminance difference is greater than a degree of luminance difference in which the rear light condition may ordinarily be determined. That is, in a scene having the sky in the background, the rear light condition is not determined.

A further embodiment of this invention determines a rear light condition in combination with a flash device. This embodiment is provided with a picture plane scanning mechanism. FIG. 7 shows this mechanism in an oblique view. The illustration includes a release lever 301 which is interlocked with a shutter button which is not shown. The release lever 301 is slidably carried by guide shafts 303a and 303b which are secured to a view finder block 302 and is urged upward, as viewed on the drawing, by a spring 304. A sector wheel 305 is pivotally carried by a shaft 306 which is secured to the view finder block 302. One end 305a of the sector wheel 305 engages a projection provided on the above-stated release lever 301. A double gear 307 is rotatably carried by the view finder block 302 and a retaining plate which is not shown. The small gear part of the double gear 307 engages the above-stated sector wheel 305. A light projection lens frame 308 for automatic focusing is rotatably carried by the view finder block 302 and is provided with a toothed wheel which is formed along the periphery of the lens frame and engages the above-stated double gear 307. A light projecting lens 318 has its optical axis arranged eccentrically relative to the lens frame 308. A light projecting element 350 is an infrared ray emitting diode (iRED) or the like. A sliding plate 309 is slidably carried by guide shafts 310a and 310b which are secured to the view finder block 302. The sliding plate 309 is provided with rack parts 309a and 309b. The rack part 309a engages the toothed wheel of the light projecting lens frame 308. A light receiving lens frame 311 is also rotatably carried by the view finder block 302 in the same manner as the light projecting lens frame 308. The light receiving lens frame 311 is provided with a toothed wheel which is formed along the periphery of the frame 311 and engages the rack part 309b of the sliding plate 309. A projection 311a is formed on the periphery of the light receiving lens frame 311. A tension spring 312 which has one end thereof secured to the view finder block 302 engages the projection 311a. A light receiving lens 313 has its optical axis eccentric relative to the light receiving lens frame 311. A light receiving photo-sensitive element 240 is the PSD which is mentioned in the foregoing and is provided for the purpose of automatic focusing.

The mechanism, which is arranged as shown in FIG. 7, operates in the following manner. A power supply switch (which is not shown) is closed when the shutter button (which is not shown) is touched or slightly depressed with a finger. When the shutter button is further depressed, the release lever 301 moves downward against the force of the spring 304. This causes the sector wheel or gear 305 to turn counterclockwise as viewed in the drawing. In association with this, the double gear 307 rotates clockwise to turn the light projecting lens frame 308 counterclockwise. The sliding plate 309 then moves in the direction of the arrow A. The light receiving lens frame 311 turns counterclockwise. Then, since the light projecting and receiving lenses 318 and 313 are eccentric relative to their lens frames 308 and 311, an object image incident on the photo-sensitive element 240 moves arcuately.

Referring to FIG. 8, the operating principle of the above-stated arrangement of this embodiment is as follows:

With the lenses eccentrically arranged as mentioned above, the range of a light flux projected by the light projecting lens 318 and the incident range of a resultant reflected light incident on the photo-sensitive element 240 via the light receiving lens 313 move along an arc on a photo taking picture plane from a part 315a to a part 315b. As shown in FIG. 8, the light projecting lens 318 and the light receiving lens 313 have the same eccentricity direction and quantity, and turn in synchronization with each other. This causes the projected light flux and the received light to synchronously move and scan a photography field along an arc obliquely across the field as shown in FIG. 8, so that distances to all the objects existing along the arc can be measured. The distance and light measuring operation thus can be accomplished on all the objects located along the movement locus of a moving light spot scanning the field.

Figure 9:
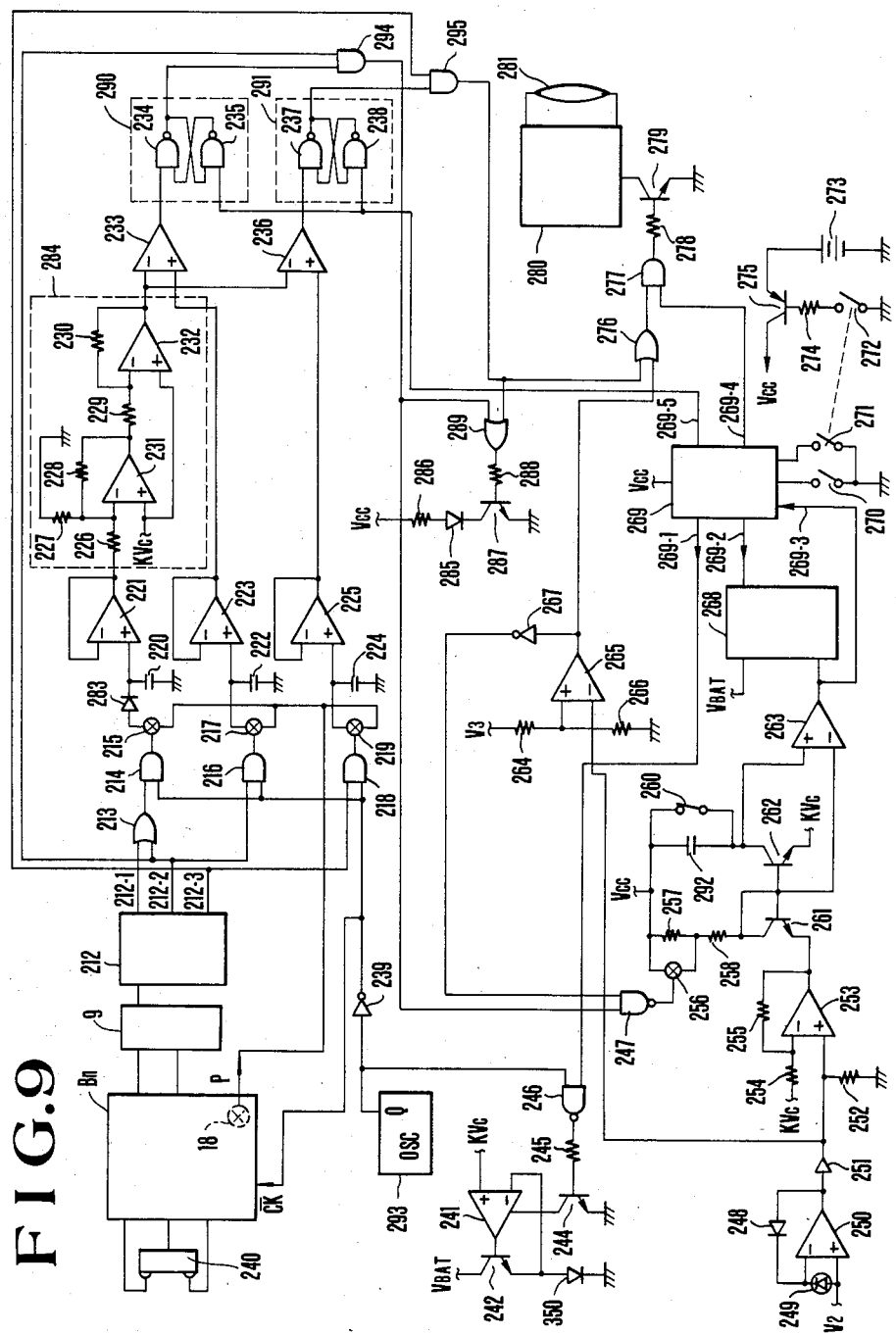
FIG. 9 is a circuit diagram showing the circuit arrangement of the embodiment shown in FIG. 7.

FIG. 9 shows a circuit arranged, according to this invention in an embodiment thereof, to be used in combination with the above spot scanning mechanism.

Referring to FIG. 9, the illustration includes a switch 271 which turns on when the release lever 301 of FIG. 7 is pushed down; and another switch 270 which turns on when the release lever 301 is further pushed down after the switch 271 has turned on. A switch processing circuit 269 performs gate control by the on-and-off operation of the switches 271 and 270 which are responsive to a power supply switch 272. When the switch 272 turns on, a transistor 275 turns on allowing a current to flow from a battery 273. Then, a potential Vcc which serves as a system power source arises on the collector side of the transistor 275. A resistor 274 limits the current. The switch processing circuit 269 begins to operate when the voltage Vcc is applied thereto. With the switch 271 turned on, the condition of a line 269-1, which is connected to a NAND gate 246, changes from a low level (hereinafter referred to as L) to a high level (hereinafter referred to as H). Another input terminal of the NAND gate 246 is connected to the Q output terminal of a square wave oscillator 293. During the field scanning operation which is described in the foregoing with reference to FIGS. 7 and 8, the output level of the NAND gate 246 becomes H or L based on the Q output of the oscillator 293. The output level of the NAND gate 246 is L when the level of the Q output is H and is H when the Q output is L. A transistor 244 turns on when the output of the NAND gate 246 is at H. A resistor 245 is provided for a current limiting purpose. When the transistor 244 turns on, an amplifier 241 becomes inoperative. In that event, a constant voltage circuit which consists of a transistor 242, the amplifier 241 and a constant voltage source KVc does not operate and the light projecting element 350, which is described in the foregoing, is extinguished. When the output level of the NAND gate 246 is at L, the transistor 244 turns off allowing the constant voltage circuit to light up the light projecting element 350. The Q output terminal of the oscillator 293 is also connected to a block Bn through an inverter 239. The block Bn has the same construction as the block B1 shown in FIG. 4, and forms a voltage corresponding to an object distance and a voltage corresponding to an object luminance in response to the output of the light receiving element (PSD) 240. That is, an output $\overline{CK}$ of the inverter 239 is supplied to a portion of the block Bn which corresponds to the portion of the block B1 to which the square wave CK1 is supplied. Through the same process as that of the block B1 in FIG. 4, when the output $\overline{CK}$ of the inverter 239 is at a low level, the division circuit 9 produces a voltage corresponding to an object distance. When the output $\overline{CK}$ is at a high level, the block Bn supplies, through the analog switch 18 to the signal line P, a voltage corresponding to an object luminance. In response to an output of the division circuit 9, a measured distance information processing circuit 212 produces three signals through lines 212-1, 212-2 and 212-3 indicating that each of the objects scanned, one after another as shown in FIGS. 7 and 8, is located at a far distance, a medium distance or a near distance. If, for example, the object is located at a far distance, the level of the line 212-1 becomes H.

The term "a far distance" as used here means, for example, a distance longer than 8 m, which is generally indicated by a pictographic mark of a mountain. The term "a medium distance" means a distance between 7 m and 1.5 m generally indicated by a space between the mountain mark and a pictographic mark of one person. The term "a near distance" means a distance not exceeding 1.5 m, which is indicated by the mark of one person.

If an object is located at a far distance, for example, the level of the line 212-1 becomes H. Therefore, the output level of the OR gate 213 becomes H. Then, the output level of the AND gate 214 becomes H or L on the output of the inverter 239. It is when the light projecting element 350 is extinguished and a voltage corresponding to the object luminance is applied to the signal line P that the output level of the AND gate 214 becomes H. At this time, the analog switch 215 turns on to allow measured light information on the far distance object to be sampled and held or peak held by means of the diode 283, the capacitor 220 and the amplifier 221.

When the output of the processing circuit 212 represents a medium distance, the level of the line 212-2 becomes H. The output level of the OR gate 213 becomes H. Accordingly, the output levels of the AND gates 214 and 216 become H or L based on the output of the inverter 239. When the output level of the AND gate 216 becomes H, the analog switch 217 turns on to allow measured light information on the medium distance object to be sampled and held by the capacitor 222 and the amplifier 223.

With a near distance object, the level of the line 212-3 becomes H. The output level of the AND gate 218 is determined by the output of the inverter 239. If the output level of the AND gate 218 is H, the analog switch 219 turns on allowing measured light information on the near distance object to be sampled and held by means of an amplifier 225 and a capacitor 224.

The above-stated peak holding process for the far distance object means that, since a scene under a rear light condition has a bright background, i.e. a bright far distance portion of the scene, the determination as to whether the scene is under a rear light condition or not requires comparison with the brightest part of the far distance portion. Furthermore, the peak holding process is also performed for the reason that information on far distance objects is likely to be obtained several times during the scanning operation. Meanwhile, the information on medium and near distance objects is sampled and held on the assumption that the information on the object at each of these distance ranges is obtained only once during the scanning operation.

The measured light information value on the objects located within these different distance ranges are thus obtained from three amplifiers 221, 223 and 225. Of these amplifiers, the output of the amplifier 221 is supplied to a comparator 233 through a rear light level setting circuit 284 which is formed by resistors 226, 227, 228, 229 and 230 and amplifiers 231 and 232 with its level lowered by a voltage value corresponding to a reference value for determination of the rear light condition. The comparator 233 compares the maximum measured light value of the far distance objects received from the rear light level setting circuit 284 with the measured light value of a medium distance object. When the measured light value of the medium distance object is smaller, the output level of the comparator 233 becomes L and the level of the latched output of NAND gates 234 and 235 becomes H. Another comparator 236 compares the maximum measured light value of the far distance objects obtained via the rear light level setting circuit 284 (the maximum measured light value may be obtained from the medium distance object through the OR gate 213) with the measured light value of a near distance object. When the latter is smaller, or if the near distance object is dark, the output level of the comparator 236 becomes L. The latched output of NAND gates 237 and 238 then becomes H. This condition in which the latched output level is at H while the measured distance information processing circuit 212 is producing a signal representing a medium distance or near distance object indicates a rear light condition. In this instance, one of the AND gates 294 and 295 produces an output H. The output level of the OR gate 289 becomes H when the output level of either of the AND gates 294 and 295 becomes H. The H output of the OR gate 289 turns on the transistor 287 to light up a light emitting diode (LED) 285. This informs the photographer of the rear light condition. Resistors 286 and 288 are provided for current limiting.

Meanwhile, in the same manner as the conventionally practiced method, the output of the photo-sensitive element which performs light measurement over a wide range of the photographing field in an averaging manner is logarithmically compressed by a diode 248. The level of the output is shifted by a diode 251. The level shifted output is supplied to a known linearity correction circuit formed by resistors 252, 254 and 255 and an amplifier 253 and automatic exposure (AE) control is accomplished. More specifically, a constant voltage obtained by the amplifier 253 is applied to the emitter of a transistor 261, which forms a current mirror. After an AF control circuit (not shown) is actuated in response to the operation of a switch 270, a switch 260 turns off. A capacitor 292 begins to be charged with a current which is equivalent to a current flowing through resistors 257 and 258. At the same time, a signal indicative of the start of power to a shutter circuit is transmitted through the line 269-2 of a switch processing circuit 269. This causes a shutter to open. When the terminal voltage of a capacitor 292 on the side of a comparator 263 coincides with the output voltage of the amplifier 253, the output level of the comparator 263 becomes L, cutting off power to the shutter circuit. The shutter closes. Furthermore, with the output level of the comparator 263 having become L, a signal indicating this is supplied via a line 269-3 to the switch processing circuit 269. The switch processing circuit 269 then momentarily produces an H signal from a line 269-4.

A comparator 265 is provided for a low level alarm detecting purpose. The comparator 265 compares a level obtained by dividing a suitable constant voltage V3 through resistors 264 and 266 with a voltage level of the cathode side of the diode 251. If the latter is lower indicating a dark object, the comparator 265 produces an H output. In the event of a bright object and an H output of an AND gate 295, that is, when the object lies at a near distance and is under the rear light condition, the above-stated LED lights up to indicate the rear light condition. In this instance, the output level of an OR gate 276 becomes H and the level of the line 269-4 also becomes H. At this instant, the output level of an AND gate 277 becomes H to turn on a transistor 279. With the transistor 279 turned on, a trigger signal is applied to a flash circuit 280 to cause a xenon tube 281 to flash. A resistor 278 is provided for current limiting. In other words, the flash device flashes the instant the shutter closes.

Furthermore, if the output level of the AND gate 294 is at H under a bright condition, a rear light condition is displayed in the same manner as described in the foregoing. However, in this case, if the output level of the AND gate 294 is alone at H, it indicates that there is no object in the near distance area. Then, the flashing operation would become meaningless since no effective light of the flash device will reach the object to be photographed. In view of this, in a bright condition, the automatic exposure AE time is shifted. More specifically, since the object is bright, the output level of the comparator 265 is at L and, therefore, the output level of the inverter 267 at H. The analog switch 256 turns off. The value of the current with which the capacitor 292 of the current mirror circuit is charged becomes smaller than the current value obtained when the analog switch 256 is on and the resistor 257 is short-circuited. Therefore, the length of time required before the voltage of the capacitor 292 on the side of the amplifier 263 reaches the output voltage level of the amplifier 253 becomes longer. Accordingly, this increases the shutter opening time. As a result, the automatic exposure AE time is shifted to an over-exposure value. The arrangement thus permits photography to be carried out with an exposure apposite to the main object without using the flash device under this condition.

With a dark object, the output level of the comparator 265 is at H, while that of the inverter 267 is at L. Therefore, the output level of the NAND gate 247 becomes H. The analog switch 256 turns on to short-circuit the resistor 257. The shutter is therefore under ordinary control. Meanwhile, with the output level of the comparator 265 having become H, the output level of the OR gate 276 becomes H. The level of the line 269-4 then momentarily becomes H causing the flash device to flash regardless of a rear light condition.

Different scene conditions are as shown below:

|  | Scene 1 | Scene 2 | Scene 3 | Scene 4 |
|---|---|---|---|---|
| Luminance at far distance: | Bright | Bright | Bright | * |
| Luminance at medium distance: | " | Dark | " | * |
| Luminance at near distance: | " | none | Dark | * |
| Luminance at picture plane: | " | Bright | Bright | Dark |

In the table above, scenes 2 and 3 represent rear light scenes. Scene 1 represents a normal light scene. Scene 4 represents a dark scene. The automatic exposure AE time is shifted for the scene 2. The flash device is flashed for the scene 3.

Furthermore, the rear light condition display to be made by the LED 285, as mentioned in the foregoing, is preferably observable within a view finder.

In accordance with the arrangement of the embodiment described above, the flash device is used when the main object is at a near distance and is judged to be under a rear light condition while the photography scene is bright. In cases where the object to be photographed is not located at a near distance, the automatic exposure AE time is shifted to a longer time value. In other words, the rear light condition is corrected by means of a flash light for an object located at a near distance within reach of effective flash light; or by adjustment of the automatic exposure AE time for an object located at a distance beyond reach of the effective flash light. Therefore, the object can always be photographed at an adequate exposure. Furthermore, in a dark photography scene, photography is always performed with a flash light, so that the possibility of camera movement due to hand vibrations can be eliminated.

A further embodiment of the invention also determines a rear light condition with use of a flash device taken into consideration.

Figure 10:
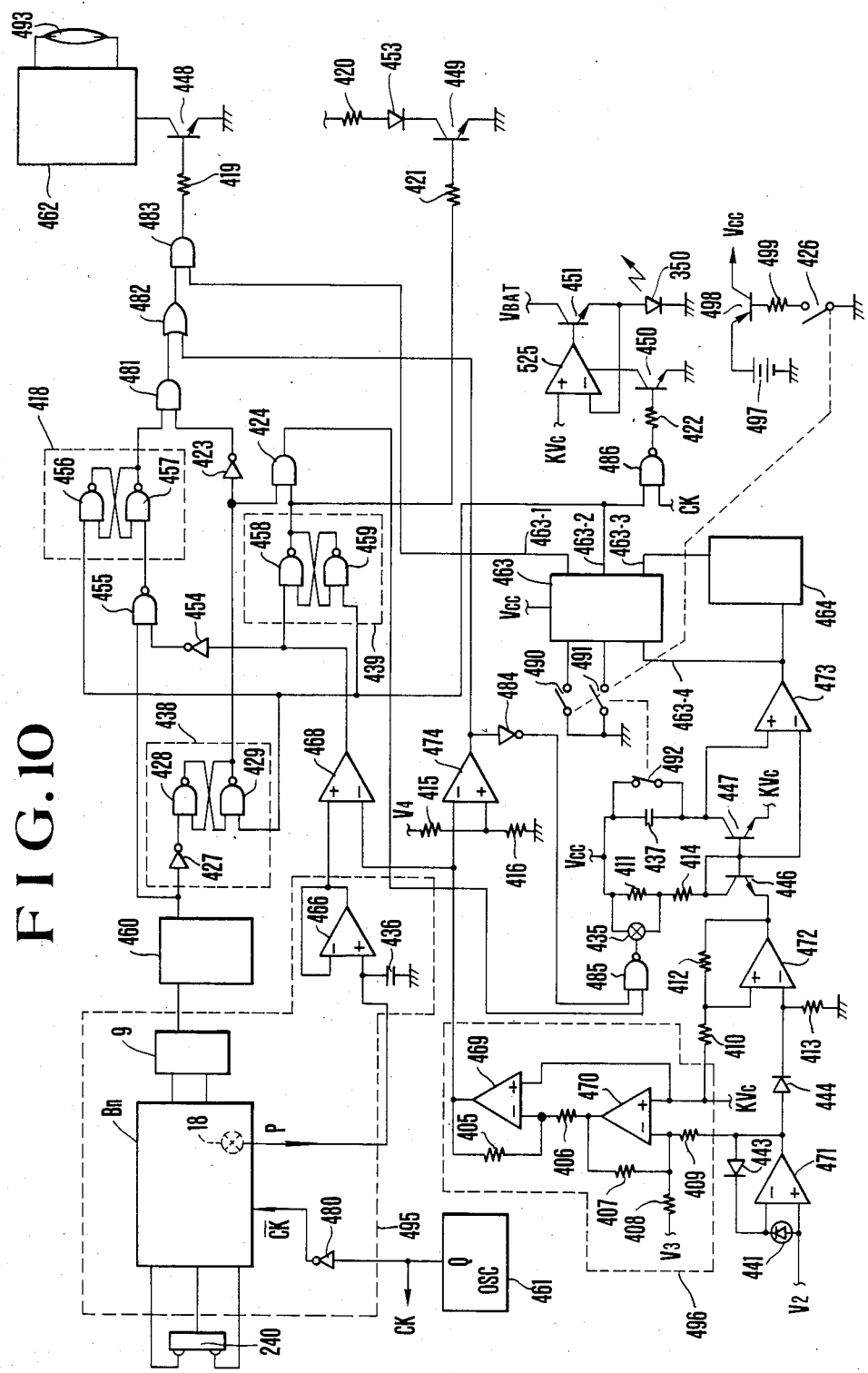
FIG. 10 is a circuit diagram showing another example of the circuit arrangement of the mechanism shown in FIG. 7.
Figure 11:
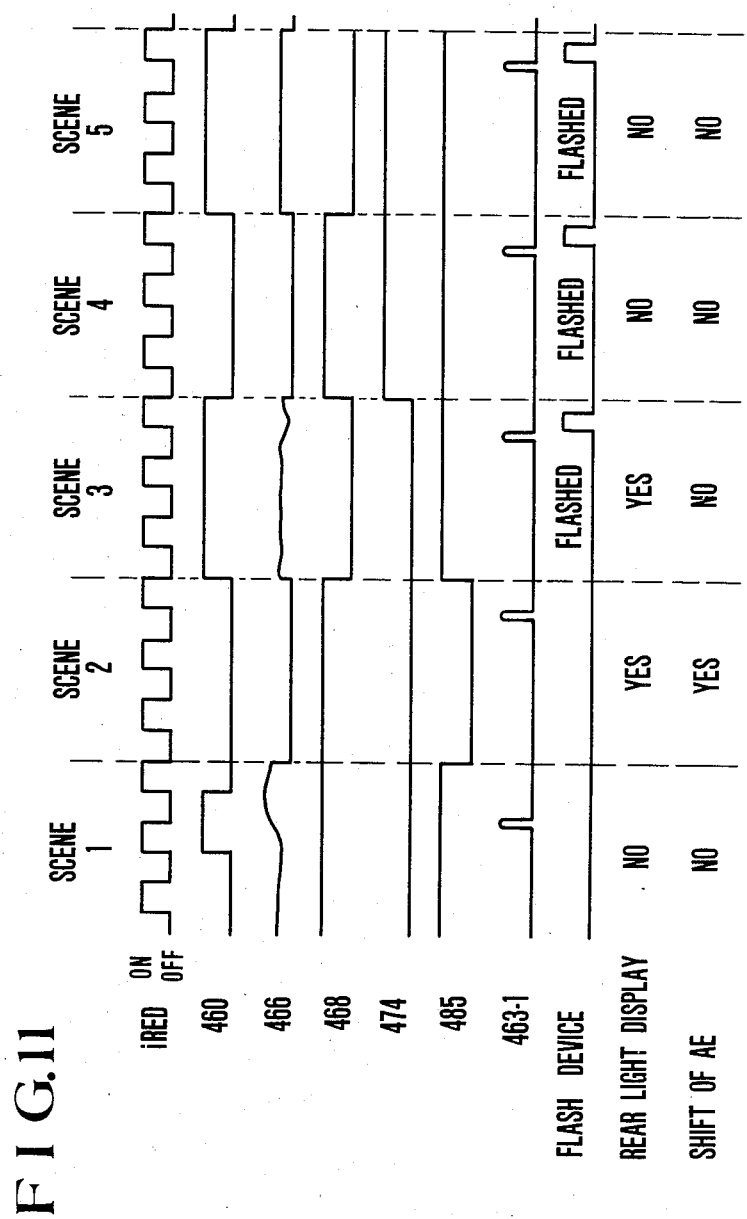
FIG. 11 is a chart showing the outputs and operating states of various elements included in the circuit of FIG. 10.

FIG. 10 shows the circuit arrangement of the above-stated embodiment to be used in combination with the spot scanning mechanism of FIG. 7. FIG. 11 shows the output wave forms and operating states of the various elements included in the circuit arrangement of FIG. 10. Referring to FIG. 10, the illustration includes switches 490 and 491 which serve as relay switches. The switch 490 turns on when the release lever 301 of FIG. 7 begins to be pushed down. The switch 491 turns on when the release lever 301 is pushed further downward. A switch processing circuit 463 performs gate control in response to the operation of the switches 490 and 491. With the release lever 301 depressed, the switch 490 is turned on by the first stroke. With the switch 490 thus turned on, a switch 426 turns on to allow a power supply voltage Vcc for all the circuit elements to be produced from a battery 497 via a transistor 498. A resistor 499 is provided for current limiting.

The switch processing circuit 463 begins to operate with the voltage Vcc applied thereto. The circuit 463 changes the level of a line 463-2, which is connected to a NAND gate 486, from a low level (L) to a high level (H) while the switch 490 is on. The NAND gate 486 is connected to the Q output terminal of an oscillator 461 which produces a square wave. In accordance with the square wave CK produced from the Q output terminal of the oscillator 461, the NAND gate 486 turns on and off. The output level of the NAND gate 486 becomes L when the Q output CK is at H and becomes H when the output CK is at L. A transistor 450 is turned on and off via a current limiting resistor 422. The operation of the transistor 450 causes a constant voltage control circuit, which is formed by an amplifier 525 and a transistor 451, to turn on and off. This in turn causes the light projecting element 350 shown in FIGS. 7 and 8 to turn on and off. The element 350 turns off when the transistor 450 is on.

The Q output terminal of the oscillator 461 is also connected to an inverter 480. The inverter 480 inverts the square wave CK to supply a square wave $\overline{CK}$ to a block Bn, which is the same as the block Bn shown in FIG. 9. The block Bn, as described in the foregoing, produces a voltage corresponding to an object distance and a voltage corresponding to an object luminance in response to the output of the light receiving element (PSD) 240. The square wave $\overline{CK}$ from the inverter 480 is supplied to a portion of the block Bn, which is the same as the portion to which the square wave $\overline{CK}$ shown in FIG. 9 is supplied. When the output $\overline{CK}$ of the inverter 480 is at a low level, that is, when the Q output of the oscillator 461 is at a high level, the division circuit 9 produces a voltage corresponding to an object distance in the same manner as in FIG. 9. When the output $\overline{CK}$ of the inverter 480 is at a high level, that is, when the Q output of the oscillator 461 is at a low level, the block Bn supplies through the analog switch 18 to the signal line P a voltage corresponding to an object luminance in the same manner as in FIG. 9. When voltage corresponding to an object distance which has been produced by the division circuit 9 is applied to a known measured distance information processing circuit 460. The measured distance information processing circuit 460 produces a high level output when the object is located at a near distance (about 1 m). On the other hand, the voltage corresponding to object luminance which has been supplied to the signal line P is applied to a sample-and-hold circuit composed of a capacitor 436 and an amplifier 466.

In this specific embodiment, the light receiving photo-sensitive element 240, which is mentioned in the foregoing performs combined functions as a distance measuring element and a spot light measuring element. During the field scanning operation described in the foregoing with reference to FIGS. 7 and 8, the photo-sensitive element 240 performs the distance measuring function in a time sharing manner when the light projecting element 350 is on and performs the light measuring function when the light projecting element 350 is off, so that the luminance and the distance of the objects to be photographed can be measured, one after another, during the scanning operation.

In addition to these elements, there is provided a photo-sensitive element 441 for automatic exposure control (AE). The element 441 has a suitable bias voltage V2 applied to the anode side thereof and widely measures the light of all the objects included in the photography field in an averaging manner. The measured light information thus obtained is logarithmically compressed by a diode 443. The logarithmically compressed measured light information shifts levels by a rear light setting circuit 496 and has the level thereof lowered by a diode 444. The measured light information thus processed is supplied to a known linearity correction circuit which is formed by resistors 410, 412 and 413 and an amplifier 472. Then, automatic exposure control is performed by means of transistors 446 and 447 which form a current mirror, a resistor 414, a capacitor 437 and a comparator 473.

The rear light level setting circuit 496 changes the gain of the measured light information received from the photo-sensitive element 441 by means of an amplifier 470 and resistors 407 and 409 to make it coincide with the degree of change on the luminance of the measured light information by the above spot scanning photosensitive element 240. Then the circuit 496 shifts the level of the measured light information by means of a suitable constant voltage V3 and a resistor 408 and thus sets a level to be used for determining a rear light condition. An amplifier 469 and resistors 405 and 406 invert the output of the amplifier 470. To the positive terminals "+" of these amplifiers 469 and 470 is applied a suitable constant voltage KVc which does not have the output of the rear light level setting circuit 496 saturated throughout the whole light measuring range. By virtue of this arrangement, the output level of the amplifier 469 becomes high when the picture plane becomes bright.

A comparator 468 compares the spot light measurement value which is obtained in the above time sharing manner with the voltage level of the light measurement value obtained from the averaging light measuring system. When the difference between these two values is greater than a set value, the photography object is determined to be under a rear light condition and produces its output at L. With the output level of the comparator 468 thus becoming L, the output level of a latch circuit 439 which consists of NAND gates 458 and 459 becomes H. This actuates a lighting circuit which consists of resistors 420 and 421 and a transistor 449 and lights up a rear light condition display LED (light emitting diode) 453. With this circuit actuated, the LED 453 lights up to indicate a rear light condition. This display is preferably made at a suitable place within the view finder.

When the output level of the measured distance information processing circuit 460 becomes H by the measured distance information obtained in the time sharing manner, i.e. in the event of a near distance (1 m or thereabout), the output level of an inverter 427 becomes L. Then, the output level of a latch circuit 438 formed by NAND gates 428 and 429 becomes L. If the object is located at a near distance and is under a rear light condition, the output level of a NAND gate 455 becomes L and that a latch circuit 418 formed by NAND gates 456 and 457 then remains at H.

When the average light measurement value is high and the picture plane is bright, a constant voltage V4 and resistors 415 and 416 have the output level of a comparator 474 at L under that condition. The output level of the comparator 474 is, of course, at H in the event that the picture plane is dark and at a low alarm level.

With the switch 490 on, when another switch 491 turns on (i.e. when the release lever 301 is pushed down further), the switch 492 turns off to release a capacitor 437 for automatic exposure AE time control from a short-circuit condition. At the same time, power is supplied via a line 463 to a known shutter circuit 464. A shutter is then opened. Since the output of the latch circuit 438 is at L, the output of an inverter 423 is at H. Therefore, the outputs of an AND gate 481 and an OR gate 482 are at H. The output of an AND gate 424 is at L and that of a NAND gate 485 is at H. This causes an analog switch 435 to turn on. A resistor 411 is short-circuited. Therefore, a current of the same value as the current flowing to the resistor 414 flows to the capacitor 437. When the terminal voltage of the capacitor 437 on the side of the comparator 473 coincides with the output voltage of an amplifier 472, the output level of the comparator 473 becomes H. Power to a shutter circuit 464 is then cut off. The shutter closes.

With the switch 491 turned on, when the change of the output level of the comparator 473 changes from H to L and is transmitted via the line 463-4, the switch processing circuit 463 supplies an H signal to an AND gate 483 via the line 463-1 thereof. A trigger signal is thus supplied via a resistor 419 and a transistor 448 to a flash circuit 462. In short, an xenon tube 493 flashes the instant the shutter closes.

When a switch 490 is turned off, latch circuits 418 and 438 are reset by the output 463-2 of the switch processing circuit 463 and produce H outputs.

When the output level of the measured distance information processing circuit 460 is at L, i.e. when the object distance is far (farther than about 1 m), the output levels of an inverter 423 and an AND gate 481 become L since the output of the latch circuit 438 is at H. The output level of an AND gate 424 becomes H. The output level of a NAND gate 485 becomes L. An analog switch 435 turns off. A resistor 411 is connected to a resistor 414. Compared with a case where the resistor 414 is used alone, a current flowing to the capacitor 437 becomes smaller in this case. Therefore, a longer period of time is required before the output of the comparator 473 is inverted. The automatic exposure AE time becomes longer. A photographic effect attainable is thus shifted somewhat toward over-exposure. In this instance, since the output level of an OR gate 482 is L, the switch 491 turns on. The flash device does not flash even when the level of the line 463 becomes H. With the switch 490 turned off, a latch circuit 439 is also reset in the same manner as the above-stated latch circuits 418 and 438 and its output becomes L.

When an object is determined to be under the rear light condition, use of a flash light as an auxiliary light would give a good photograph without much shadow if the object is located at a near distance. However, if the object is located at far distance, the flash light is no longer capable of serving as an auxiliary light and becomes useless. In that event, therefore, the automatic exposure AE time is shifted toward the over-exposing side as mentioned above, so that a good picture can be taken with an exposure apposite to the main object. For this purpose, the embodiment extends the automatic exposure AE time by cancelling the arrangement to short-circuit the resistor 411 in the event of a far object distance, so that the main object will not become too dark in the picture to be taken.

Furthermore, when the photo-taking picture plane is excessively dark, the output level of the comparator 474 becomes H. The output level of the NAND gate 485 becomes H turning on the analog switch 435. The resistor 411 is short-circuited and the automatic exposure AE time is not shifted. The output level of the OR gate 482 becomes H independent from the output of the AND gate 481, which limits the flashing operation based on the object distance. Then, at the change-over point of the comparator 473, a trigger signal is applied to the flash circuit 462 to permit normal flash photography in the same manner as mentioned in the foregoing.

In the system described above, during a field scanning process, the object distance is determined while the light projecting element 350 is lit and light measurement is accomplished while the light projecting element 350 is extinct at the same point of time. If the flickering speed of the light projecting element 350 is sufficiently fast relative to the field scanning speed, there will be almost no discrepancy between the distance measuring point and the light measuring point. Therefore, the measured light information which is obtained at the time when the object distance is judged to be a near distance from the output of the measured distance information processing circuit 460 is produced from the amplifier 466 to be compared with an average measured light value at the comparator 468. Then, in a rear light condition, the output level of the NAND gate 455 becomes L and that of the latch circuit 418 becomes H. The AND gate 481 thus always produces an H output only when an object located at a near distance is determined to be under a rear light condition.

FIG. 11 shows the gate outputs and operating states of the circuit elements of FIG. 10 obtained for different photography scenes. The conditions of these scenes are as shown in the following table:

|  | Scene 1 | Scene 2 | Scene 3 | Scene 4 | Scene 5 |
|---|---|---|---|---|---|
| Object distance: | far/near | far | near | far | near |
| Object luminance: | bright | dark | dark | dark | dark |
| Background luminance: | bright | bright | bright | dark | dark |

The scenes 2 and 3 are in rear light conditions. The scenes 4 and 5 normally require flash photography. The scene 1 photographed by normal daylight photography. The flash device is used for the scene 3, which is in a rear light condition. However, in the scene 2 which is beyond reach of a flash light, the automatic exposure AE time is shifted. For the scenes 4 and 5, the flash device is used regardless of the object distance.

In this embodiment, as described above, the object distance is measured by means of the distance and light measuring system which scan the photo-taking field. The flash device is used when the object is determined to be under a rear light condition. However, if an object is located at a distance beyond the effective reach of the flash light, the flash device is not flashed while a display is made in order to show the rear light condition. In that event, the automatic exposure AE time is shifted to an over-exposing value. Furthermore, flash photography is used without shifting the automatic exposure AE time for an object which is dark enough for use of a flash light.

Furthermore, in each of the embodiments described above, a rear light condition or no rear light condition is judged from a level difference obtained from the light measuring system. However, this can also be accomplished by using the level ratio of the light measuring system instead of the level difference.

In accordance with this invention, as described in the foregoing, the main object to be photographed is assumed to be located at a near distance. Objects located at far distances are assumed to include such a light source as the sun that causes a rear light condition. With this assumption, distances to several parts within the photo-taking picture plane are measured. Then, the luminance condition of a near distance object is judged from distance information thus obtained. Therefore, a rear light condition can be accurately and simply determined without being affected by the position of the photography object within the picture taking plane. The invention, therefore, has a great advantage.

It is another advantage of the invention that, when a main object which is judged to be under a rear light condition is located at a distance beyond the effective reach of a flash light, the automatic exposure AE time is shifted to a longer time value to make an apposite exposure for the main object without flashing the flash device. In the event of a rear light condition, therefore, the main object can always be photographed with optimum exposure.

What is claimed is:

1. A backlit detecting device for a camera, comprising:
    (a) distance measuring means for measuring distances of a plurality of parts within a photographic scene zone;
    (b) first selection means for selecting, in response to an output of said distance measuring means, one of said parts which said distance measuring means detects to have a shortest of said distances;
    (c) second selection means for selecting, in response to an output of said distance measuring means, one of the parts which said distance measuring means detects to have a longest of said distances; and
    (d) comparison means for comparing light of said part selected by said first selection means with light of the part selected by said second selection means, said comparison means being able to make a judgement that said photographic scene zone is in a backlit condition when a level of the light of the part selected by said second selection means is higher than that of the part selected by said first selection means by more than a predetermined value.

2. A device according to claim 1, further comprising shift means for shifting said predetermined value of said comparison means to a value higher than said predetermined value when said longest of the distances detected by said distance measuring means is longer than a predetermined distance.

3. A backlit detecting device for a camera, comprising:
    (a) distance measuring means for measuring distances of a plurality of parts within a photographic scene zone;

(b) selection means for selecting, in response to an output of said distance measuring means, one of said plurality of parts which said distance measuring means detects to have a shortest of said distances; and
(c) comparing means for comparing light of the part selected by said selection means with that of the whole photographic scene zone including said part, said comparison means being able to make a judgement that the photographic scene zone is in a backlit condition when a level of light of said whole photographic scene zone is higher than that of the part selected by said selection means by more than a predetermined value.

4. A backlit detecting device for a camera, comprising:
(a) distance measuring means for measuring distances of a plurality of parts within a photographic scene zone;
(b) selection means for selecting, in response to an output of said distance measuring means, one of said plurality of parts which said distance measuring means detects to have a longest of said distances; and
(c) comparison means for comparing light of the part selected by said selection means with that of the whole photographic scene zone including the part, and said comparison means being able to make a judgment that the photographic scene is in a backlit condition when a level of the light of said part selected by said selecting means is higher than that of the whole photographic scene by more than a predetermined value.

5. A backlit detecting device for a camera, comprising:
(a) comparison means for comparing light of a first zone of a photographic scene in which a main object is supposed to be present with light of a second zone of the photographic scene in which a back scene is supposed to be present, said comparison means being able to make a judgment that the photographic scene is in a backlit condition when a level of the light of said second zone is higher than that of the first zone by more than a predetermined value;
(b) distance measuring means for forming a distance information of said second zone; and
(c) shift means for shifting the predetermined value to a larger value in response to a distance information output from said distance measuring means that the second zone has a distance longer than a predetermined distance.

* * * * *